United States Patent
Hiragaki et al.

[15] 3,679,309
[45] July 25, 1972

[54] INSTRUMENTS FOR MEASURING MOLECULAR ORIENTATIONS WITH THE AID OF FLUORESCENCE

[72] Inventors: Hideho Hiragaki; Yoshihiro Mochida, both of Tokyo, Japan

[73] Assignee: Japan Spectroscopic Co., Ltd., Tokyo, Japan

[22] Filed: May 4, 1970

[21] Appl. No.: 34,106

[30] Foreign Application Priority Data

| | | |
|---|---|---|
| May 6, 1969 | Japan | 44/34027 |
| May 6, 1969 | Japan | 44/34028 |
| May 6, 1969 | Japan | 44/34029 |
| May 12, 1969 | Japan | 44/35793 |
| Oct. 30, 1969 | Japan | 44/86453 |
| Nov. 29, 1969 | Japan | 44/95371 |
| Dec. 1, 1969 | Japan | 44/95739 |

[52] U.S. Cl. .......................... 356/114, 250/71.5
[51] Int. Cl. ...................... G01n 21/40, G01j 39/18
[58] Field of Search .................. 356/114; 250/71, 86

[56] References Cited

UNITED STATES PATENTS

3,151,204    9/1964    Stacy .......................... 250/71

*Primary Examiner*—Ronald L. Wibert
*Assistant Examiner*—Conrad Clark
*Attorney*—Finnegan, Henderson, Farabow & Garrett

[57] ABSTRACT

This invention relates to instruments for measuring molecular orientations with the aid of fluorescence, or more particularly to instruments for measuring molecular orientations that can measure the types of orientations of the macromolecular system of the samples through the measurement of the angular distribution of the intensity of the polarized components in the fluorescence emanated by the samples, by making use of the dual anisotropy exhibited when the light is absorbed and the fluorescence emitted, particularly with an eye to the anisotropy of fluorescent molecules dispersed among macromolecules.

13 Claims, 16 Drawing Figures

PATENTED JUL 25 1972 3,679,309

INVENTORS
SHIGEHO HIRAGAKI
YOSHIHIRO MOCHIDA

*Finnegan, Henderson & Farabow*

ATTORNEYS

INVENTORS
SHIGEHO HIRAGAKI
YOSHIHIRO MOCHIDA

*Finnegan, Henderson & Farabow*
ATTORNEYS

INSTRUMENTS FOR MEASURING MOLECULAR ORIENTATIONS WITH THE AID OF FLUORESCENCE

BACKGROUND OF THE INVENTION

Conventionally, for the examination of the relationship between a macromolecular system and its internal structure, the measurement making use of such optical anisotropies as dichroism and double refraction that are brought about by infrared absorption has been employed. Such measurement of dichroism and double refraction, however, can not furnish, theoretically, any information as to the type of orientation of the macromolecular system, though it can tell its extend of orientation. For example, various types of partially uniaxial orientations can be assessed only as to the extent of orientation, all by the form of spheroids, and can not be distinguished from each other as to the type of orientation.

BRIEF SUMMARY OF THE INVENTION

This invention has now developed instruments for measuring molecular orientations that can furnish information as to the type of orientation of the molecular system, which has never been available from the conventional measurement of dichroism and double refraction, through the measurement of the angular distribution of the intensity of the polarized components, taking into consideration the fact that fluorescent molecules having optical anisotropies, in general, exhibit their anisotropies twice, when the light is absorbed and the fluorescence emitted, while the fluorescence keeps on emitting from the excited fluorescent molecules.

BRIEF DESCRIPTION OF THE DRAWING

The invention will be better understood from the accompanying drawings of which:

FIGS. 7(a) and (b) are the views showing an automatic device to rotate a polarizer in an instrument for the molecular orientation measurement according to this invention.

DETAILED DESCRIPTION

Figure 1:
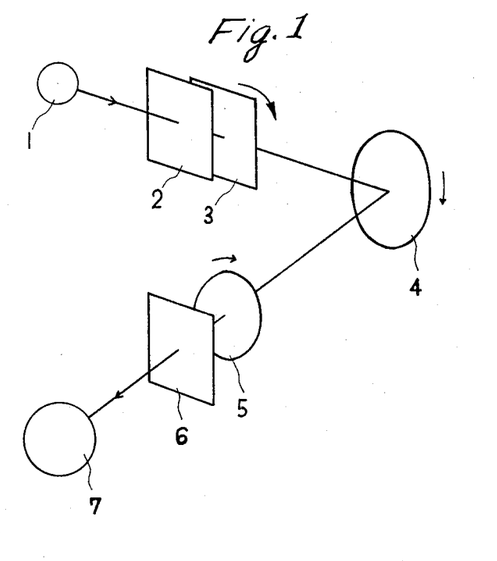
FIG. 1 is a view showing the basic optical system of an instrument for measuring molecular orientations according to this invention.

In FIG. 1 showing the basic optical system of an instrument for the molecular orientation measurement according to this invention, 1 is a light source, 2 a monochromatic light filter, 3 a polarizer, 4 a sample, 5 an analyzer, 6 a cut filter and 7 a detector respectively. And, though not illustrated, such monochromatic light filter, polarizer, sample, analyzer and cut filter are each placed on a holder. The light from the light source 1, after passing through the monochromatic light filter 2, becomes a monochromatic light having an exciting wave length corresponding to the absorption wave length of the fluorescent molecules dispersed in the sample, and then enters the polarizer 3. When getting out of the polarizer 3, it has been converted into a linearly polarized light that strikes upon the sample 4. The fluorescence emitted from the excited fluorescent molecules in the sample passes through the analyzer 5 and, after shutting off with the aid of the cut filter 6 any exciting light mixed in by scattering and reflection, enters the photoelectron multiplier to get converted into electrical signals. Whereas the polarizer 3 (or, otherwise, the analyzer 5) is fixed, the analyzer 5 (or, otherwise, the polarizer 3) is rotated within a plane perpendicular to the optical axis in order to make the electric vector direction of the linearly polarized light incident upon the sample parallel and perpendicular with respect to the electric vector direction of the linearly polarized light incident upon the detector.

When an angle formed by the molecular axis of the molecular system that composes the sample and the electric vector direction of the linearly polarized light incident upon the sample is expressed by $\alpha$ and an angle formed by the same molecular axis and the electric vector direction of the linearly polarized light incident upon the detector, that is, the electric vector direction of the polarized components in the fluorescence, by $\beta$, the intensity of the polarized components in the fluorescence ($I$) is expressed by the following equation.

$I = K \cos^2\alpha \cdot \cos^2\beta$ ($K$ is a proportional constant)

When the polarizer and the analyzer are positioned in parallel with each other:

$I_{\parallel} = K \cos^4\alpha$

When the polarizer and the analyzer are placed perpendicular to each other:

$I_{\perp} = K \cos^2\alpha \cdot \sin^2\alpha$

Therefore, if the angular distribution of the intensity of the polarized components in the fluorescence emitted, when excited by the linearly polarized light, from the system wherein fluorescent molecules are dispersed is measured, it will furnish a distribution of molecular orientations in the system to be determined by the moment of four dimensions. This means that it is a theory that can furnish a direct information as to the type of molecular orientation in the system, unlike the moment of two dimensions obtained by a general optical anisotropy. And this fluorescent method can distinguish various types of partially uniaxial orientations perfectly and accurately.

For the purpose of measuring the angular distribution of the intensity of the polarized components in fluorescence, a sample 4 is rotated on a single plane in order to gradually change the relative angle formed by the electric vector direction of the linearly polarized light incident upon the sample and the orientation direction of the molecular system that composes the sample. When the types of three-dimensional orientations are to be measured in order, for example, to distinguish various types of partially uniaxial orientations from each other, a sample coordinate system is gradually rotated three-dimensionally with respect to a measurement coordinate system, and the measurement is carried out while rotating the sample in the said sample coordinate system. Thus, as described below, the sample 4 can be rotated two-dimensionally in the sample coordinate system and, at the same time, it is placed on a sample holder that can be rotated three-dimensionally with respect to the measurement coordinate system.

Figure 2A:
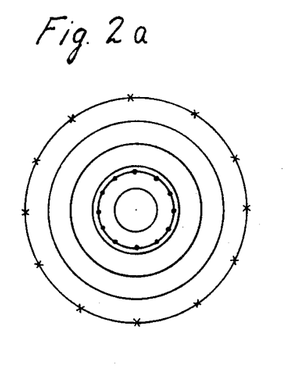
FIGS. 2(a), (b) and (c) are the views showing the theoretical angular distribution spectra of the intensity of the polarized components of fluorescence obtained by measuring the samples whose molecular systems are perfectly non-oriented, perfectly oriented on one axis, and orthogonally oriented on two axes respectively with an instrument for the molecular orientation measurements according to this invention.
Figure 2B:
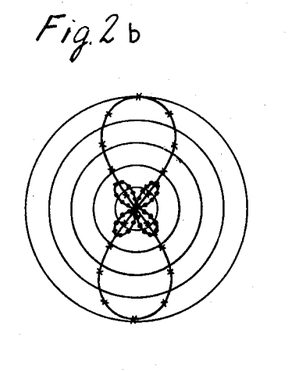
Figure 2C:
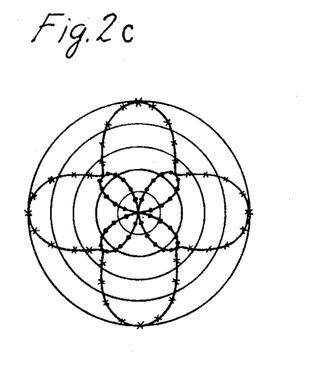

A theoretical circular spectrum obtained by such measurement of the angular distribution of the intensity of the polarized components in fluorescence becomes as shown in FIG. 2. In FIG. 2, (a) shows a plane non-orientation, (b) a plane uniaxial perfect orientation and (c) a plane perpendicularly intersected biaxial perfect orientation respectively, while an Xrmark (x) indicates a case wherein the polarizer and the analyzer are positioned in parallel with each other and a black point(●)indicates a case wherein they are positioned perpendicular to each other. The plane non-orientation and the plane perpendicularly intersected biaxial perfect orientation can not be distinguished by a conventional method, since they are optically isotropic on a plane and, therefore, do not show any dichroism nor double refraction, though they represent two extremely different plane orientation types. But they can be perfectly distinguished by this fluorescent method, since they draw perfectly different spectra as shown in FIGS. 2(a) and (c). Furthermore, the distribution of such three-dimensional orientations as the aforesaid various types of partially uniaxial orientations also can be distinguished accurately by obtaining in advance the theoretical angular distribution of the intensity of the polarized components in fluorescence.

Figure 3:
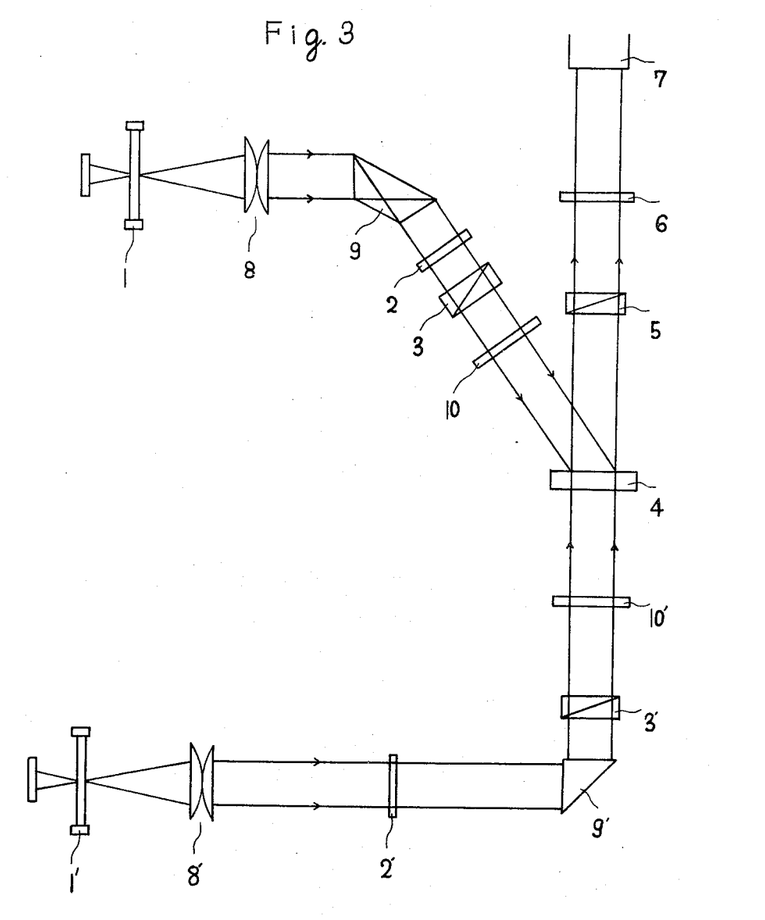
FIG. 3 is a view showing the optical system of an instrument for the molecular orientation measurement according to this invention that has two exciting optical systems.

FIG. 3 shows the optical system of an instrument for the molecular orientation measurement according to this invention that has two exciting optical systems, that is, a reflection system and a transmission system. And the same symbols as used in FIG. 1 indicate the corresponding parts. A light source 1, a monochromatic light filter 2 and a polarizer 3 make up a reflection exciting system, while a light source 1', a monochromatic light filter 2' and a polarizer 3' make up a transmission exciting system.

Now explanation will be given first to the reflection system. The light emanated from the light source 1 passes through a lens system 8 to be converted into a parallel light flux and is, then, bent by a reflection prism 9 in such a manner as to have a proper incident angle with respect to the surface of a sample. The light coming out of the reflection prism passes through the monochromatic light filter 2 to become a monochromatic exciting light that corresponds to the absorption wave length of the fluorescent molecules. And then it is converted into a linearly polarized light after passing through a polarizer 3 and finally strikes upon the sample 4 through an iris 10. The fluorescence emitted from the fluorescent molecules dispersed in the sample passes through the analyzer 5 and, after shutting off with the aid of a cut filter 6 any exciting light mixed in by scattering and reflection, enters a photoelectron multiplier to be converted into electrical signals. Meanwhile, the light emanated from a light source 1' is converted into a light flux by a lens system 8' and, then, further into a monochromatic exciting light that corresponds to the absorption wave length of the fluorescent molecules by means of a monochromatic light filter 2', and finally enters a prism 9'. The light refracted perpendicularly by the prism 9' becomes a linearly polarized light after passing through a polarizer 3' and strikes upon the surface of the sample at an incident angle of 0° through an iris 10'. The fluorescence emitted from the sample passes, like the case of the reflection system, through the analyzer 5 and the cut filter 6 and enters the photoelectron multiplier 7 to be converted into electrical signals. Whereas the polarizers 3 and 3' (or, otherwise, the analyzer 5) are fixed, the analyzer 5 (or, otherwise, the polarizers 3 and 3') is rotated within a plane perpendicular to the optical axis in order to make the electric vector direction of the linearly polarized light incident upon the sample parallel and perpendicular with respect to the electric vector direction of the linearly polarized light incident upon the detector. Furthermore, the sample 4 can be rotated two-dimensionally in the sample coordinate system and, at the same time, it is placed on a sample holder that can be rotated three-dimensionally with respect to the measurement coordinate system, for the convenience of the measurement of the angular distribution of the intensity of the polarized components in fluorescence.

With such an instrument as described above that has two systems, that is, a reflection exciting system with a proper incident angle and a transmission exciting system with an incident angle of 0°, a most favorable exciting method can be applied to each specific sample in accordance with its optical property, shape, turbidity, etc., which, in turn, enables the measurement of various samples having widely-ranged optical properties, shapes, and turbidities with a single apparatus.

Figures 4, 5:
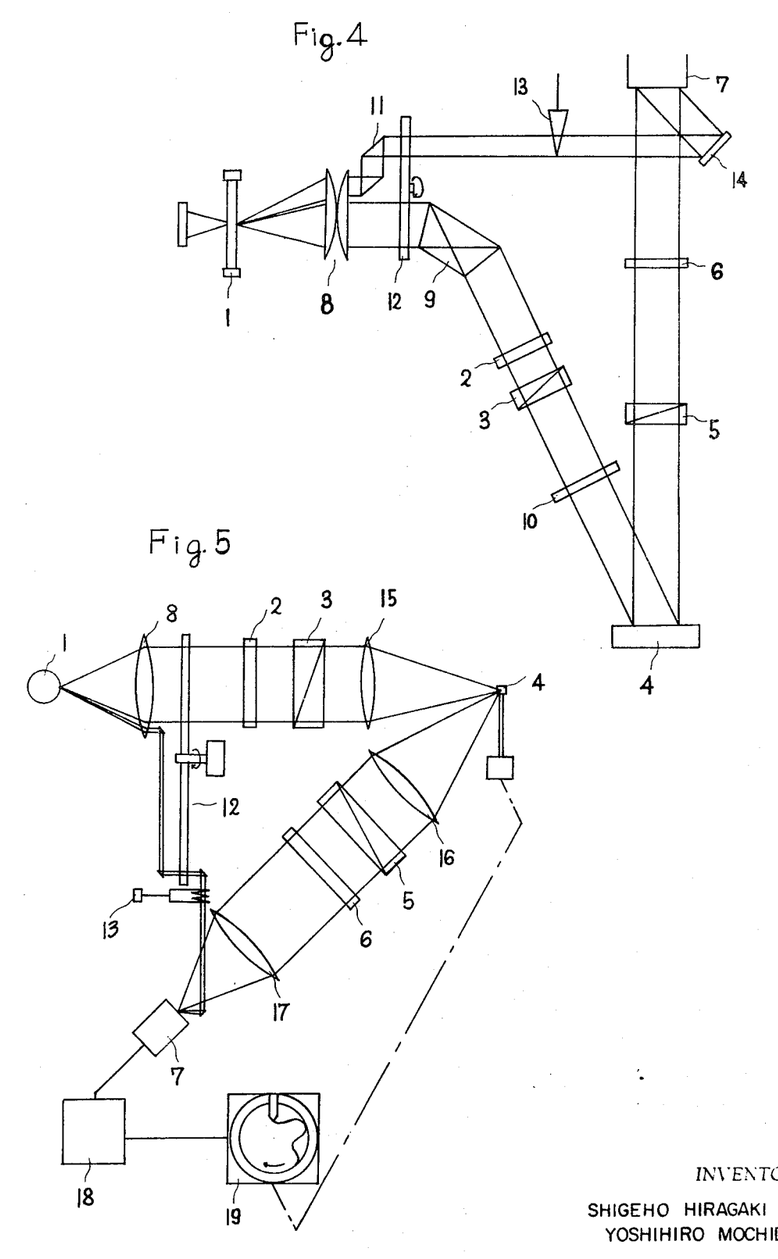
FIG. 4 is a view showing the optical system of a double beam type instrument for the molecular orientation measurement according to this invention.
FIG. 5 is a view showing the optical system of an instrument for the molecular orientation measurement of the microscopic samples according to this invention.

FIG. 4 shows the optical system of a double beam type instrument for the molecular orientation measurement according to this invention that has two light fluxes, that is, a standard flux and a sample flux. And the same symbols as used in FIGS. 1 and 2 indicate the corresponding parts.

The light emanated from a light source 1 passes through a lens system 8 to become a parallel light flux and, then, part of the latter is taken out by a long prism 11 to be converted into a standard light flux and the remaining portion becomes a sample light flux. These two light fluxes are intermitted at a proper frequency by means of, for example, a rotating semicircular chopper 12. The modulated sample light flux changes its course after passing through a reflection prism 9, gets converted by a monochromatic light filter 2 into a monochromatic light corresponding to the wave length of the exciting light and further into a linearly polarized light by a polarizer 3, and strikes upon the sample 4 through the iris 10. The fluorescence emitted from the sample passes through an analyzer 5 and, after shutting off with the aid of a cut filter any exciting light mixed in by scattering and reflection, enters a photoelectron multiplier to get converted into electrical signals. Meanwhile, the modulated standard light flux is weakened by a light extinguisher 13 to the level of the intensity of the fluorescence and reflected by a plane mirror, and finally introduced into the same photoelectron multiplier 7. Whereas the polarizer 3 (or, otherwise, the analyzer 5) is fixed, the analyzer 5 (or, otherwise, the polarizer 3) is rotated within a plane perpendicular to the optical axis in order to make the electric vector direction of the linearly polarized light incident upon the sample parallel and perpendicular with respect to the electric vector direction of the linearly polarized light incident upon the detector. Furthermore, the sample 4 can be rotated two-dimensionally in the sample coordinate system and, at the same time, it is placed on a sample holder that can be rotated three-dimensionally with respect to the measurement coordinate system for the convenience of the measurement of the angular distribution of the intensity of the polarized components in fluorescence.

With such an instrument for the molecular orientation measurement as described above that has two beam type optional system, it is possible to improve the SN ratio remarkably, as compared with the case of a single beam system, by means of the relative alternating current amplification of the electric signals sent from the photoelectron multiplier 7 upon which the standard light and the fluorescence from the sample strike alternately in accordance with the rotation of the chopper 12. And it is also possible to get rid of the influences exercised by the fluctuation of the intensity of the intensity of the light source etc. And both contribute to the acquisition of more accurate spectra.

FIG. 5 shows the optical system of an instrument for the molecular orientation measurement of the microscopic samples according to this invention. And the same symbols as used in other figures referred to above indicate the corresponding parts.

The light emanated from a light source 1 passes through a lens system 8 to become a parallel light flux that is then divided into a sample exciting light and a standard light and intermitted periodically by a chopper 12. The modulated standard light passes through a light extinguisher 13 and is introduced, after being reduced to almost the same level of the intensity as that of the fluorescence from the sample, into a photoelectron multiplier 7. On the other hand, the modulated sample exciting light passes through a monochromatic light filter 2 and a polarizer 3 to become a monochromatic linearly polarized light corresponding to the wave length for excitation, and then enters a lens system 15. This lens system 15 applies to a microscopic sample 4 the exciting monochromatic linearly polarized light fully reduced by a condensing lens that is used for reducing the size of the light flux. The fluorescence emitted from the fluorescent molecules in the sample passes through an objective lens to enlarge the image of the sample and, then, enters an analyzer as a parallel light flux. The fluorescence coming out of the analyzer 5 passes, after shutting off with the aid of a cut filter 6 any exciting light mixed in by scattering and reflection, through a lens system 17 and is condensed upon the photoelectron surface of the photoelectron multiplier 7. The periodically intermitted sample exciting light brings about the periodically intermitted emission of the fluorescence from the sample resulting in the alternated incidence of the standard light and the fluorescence into the photoelectron multiplier 7, which forms what is called a double beam ratio recording system. The output from the photoelectron multiplier 7, as is generally known, is electrically treated through an electric system 18 consisting of an amplifier, a synchronous rectifier, a servo-amplifier, etc. and records the intensity of the fluorescence from the sample on a recorder 19. Whereas the polarizer 3 (or, otherwise, the analyzer 5) is fixed, the analyzer 5 (or, otherwise, the polarizer 3) is rotated within a plane perpendicular to the optical axis in order to make the electric vector dimension of the linearly polarized light incident upon the sample parallel and perpendicular with respect to the electric vector direction of the linearly polarized light incident upon the detector. Furthermore, the sample 4 can be rotated two-dimensionally in the sample coordinate system and, at the same time, it is placed on a sample holder that can be rotated three-dimensionally with respect to the measurement coordinate system. Thus the angular distribution spectrum of the intensity of the polarized components in fluorescence can be recorded on the recorder that is rotated synchronously with the two-dimensional rotation of the sample.

Extinguishment of polarized light accompanying the reduction and enlargement of the image can be made so negligible by a proper installation of a condensing and an objective lens that it exercises little influence upon the measurement. Therefore, the installation of the condensing and the objective lens before and after the sample as described above makes it possible to measure the molecular orientation of such microscopic samples as single fibers etc. with ease.

Figure 6A:
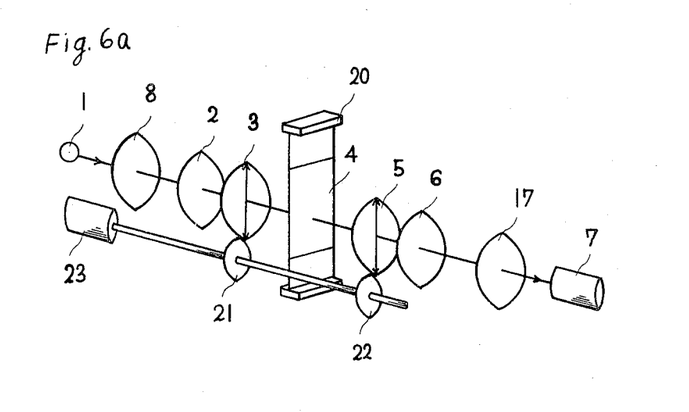
FIG. 6(a) and (b) are the views showing a device to rotate a polarizer and an analyzer synchronously in an instrument for the molecular orientation measurement according to this invention.
Figure 6B:
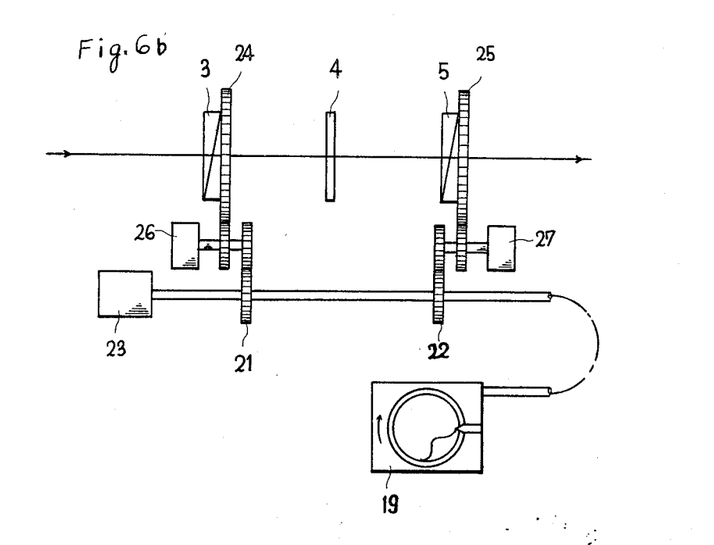

FIGS. 6(a) and (b) show an instrument for measuring the angular distribution of the intensity of the polarized components of fluorescence by rotating the polarizer 3 and the analyzer 5 synchronously while fixing the sample, instead of rotating not only the analyzer 5 (or, otherwise, the polarizer 3) within a plane perpendicular to the optical axis but also the sample two-dimensionally while fixing the polarizer 3 (or, otherwise, the analyzer 5). And the same symbols as used in other figures referred to above indicate the corresponding parts.

The light emanated from a light source 1 passes through a lens system 8 to become a parallel light flux that is then converted by a monochromatic light filter 2 into a monochromatic light corresponding to the wave length of the exciting light. The exciting monochromatic light, after passing through the polarizer 3, becomes a linearly polarized light and strikes upon the sample 4. The sample 4 has been expanded by such means as, for example, an expander 20. The fluorescence emitted from the sample 4 passes through the analyzer 5 and further, after shutting off with the aid of a cut filter 6 any exciting light mixed in by scattering and reflection, through a lens system 17, and is condensed upon the photoelectron surface of a photoelectron multiplier 7. The output from the photoelectron multiplier 7, as is generally known, is electrically treated and records the intensity of the fluorescence from the sample on the recording system. The polarizer 3 and the analyzer 5 are engaged with gears 21 and 22, respectively, which are mounted on a common rotation shaft for driving a motor 23 that brings about a synchronous rotation of the polarizer 3 and the analyzer 5. In this case, two separate motors can be used to rotate the polarizer and the analyzer synchronously, but, of course, the use of a single motor is more convenient for the purpose.

The polarizer is fixed to a polarizer holder having a gear 24 and the analyzer to an analyzer holder having a gear 25. The gears 24 and 13 and the polarizer and the analyzer holders have each an opening that permits the passage of the light through their central portions. The gear 24 engages with the gear 21 through a magnetic clutch 26, while the gear 25 engages with the gear 22 through a magnetic clutch 27. The clutches 26 and 27 connect the gears 21 and 24 with the gears 22 and 25 when the motor 23 is switched in and disconnects then when the motor is switched off. Therefore, if the polarizer and the analyzer are set parallel or perpendicular to each other by manual rotation, while switching off the motor 23, and, then, rotated at a ratio of 1 : 1 by switching in the motor, the angular distribution spectra of the intensity of the polarized components ($I_\parallel$) and ($I_\perp$) are drawn on the recorder 19. And if the analyzer is rotated, by means of a proper speed change gear, faster than the polarizer by a factor of a certain integral number (for example, 120), the angular distribution spectra of ($I_\parallel$) and ($I^\perp$) can be obtained at a time, because the polarizer and the analyzer come into a parallel and a perpendicular position repeatedly at periodical intervals, while satisfying the condition of synchronism.

As described above, if measurement is carried out by rotating the polarizer and the analyzer, instead of the sample, synchronously, it makes it possible to measure the molecular orientation of a sample easily even in such a case wherein it is difficult to rotate the sample two-dimensionally as it is desired to carry out measurement while heating, cooling or expanding under heat the sample.

FIGS. 7(a) and (b) are the schematic representations of an automatic polarizer rotation device convenient for rotating the polarizer 3 (or, otherwise, the analyzer 5) within a plane perpendicular to the optical axis.

The rotation of a driving motor 28 is transmitted to a polarizer driving gear A 32 through a friction gear 29, a bevel gear 30 and a gear 31. The friction gear 29 is a device that cuts off the transmission of rotation by racing the driving motor 28 when more than a certain amount of load is put on the part whereto the rotation is transmitted. A polarizer holder 33 containing the polarizer 3 holds a shaft in common with the polarizer driving gear A 32 and rotates synchronously with the latter. Between the polarizer driving gear A 32 and the polarizer holder 33 is installed a polarizer driving gear B 34 that can be rotated independently of the rotation shaft of the polarizer driving gear and the polarizer holder. As shown in FIG. 7(b), a circular-arc-shaped hollow 35 is provided in a sector with a central angle of 90° that is located in a part of the polarizer driving gear B 34, and a stopper 36 fitted to the polarizer holder is built in the said hollowed part. The polarizer driving gear B 34 engages with a brake gear 37 and the latter's rotation shaft connects with a magnet brake 38. The lead wires from the driving motor 28 and the magnet brake 38 are collected on to a switch 39. On the switch 39, D stands for the drive (that is, the uniform revolution of the polarizer) while $\perp$ and " represent the conditions in which the polarizer and the analyzer are perpendicular and parallel to each other, respectively. However, as it is learned from the scales on the polarizer and the analyzer whether they are practically perpendicular or parallel to each other, those symbols on the switch are meant to indicate a stop of the uniformly revolving polarizer and a 90° turn from that position, respectively.

When the switch is set to D, the revolution of the rotating motor 28 is transmitted to the polarizer holder 33 and brings about a uniform rotation of the polarizer 3. If the polarizer holder 33 rotates in the direction of an arrow 40 at that time, a stopper 36 comes into contact with the polarizer driving gear B 34 in the position shown in FIG. 7(b), and the latter rotates with the polarizer holder 33. Thus, the brake gear 37 engaged with the polarizer driving gear B rotates, too. When the switch is turned to $\perp$, the driving motor 28 keeps on rotating, but the magnet brake 38 is put on to stop the brake gear 37 which gives rise to the load through the stopper 36, so that the transmission of rotation is cut off by the friction gear 29, thus allowing the driving motor 28 to race and the polarizer holder 33 to come to a halt. When the switch is turned to ", the driving motor 28 rotates the other way. As there occurs no load in the opposite direction, that is, in the direction of an arrow 41, the polarizer holder 33 rotates until the load occurs again when the stopper 36 reaches the other end of the circular-arc-shaped hollow portion 35 of the polarizer driving gear B 34, that is, when it turns through an angle of 90°. During this time, the polarizer driving gear B 34 and the brake gear 37 remain at a stop. What is numbered 42 is a scale arranged on the polarizer holder. And the rotation shafts of the polarizer driving gear A 32 and the polarizer holder 33 are made hollow so as to allow the passage of the light through their central portions.

With such an automatic polarizer rotating device as described above, if the polarizer 3 and the analyzer 5 are manually rotated in advance to a position where they become perpendicular or parallel to each other, it is possible to obtain a spectrum of $I\perp$ or $I_\parallel$ by setting the switch 39 to $\perp$ or'. And, in addition, if the switch is set to D, it is possible to obtain the spectra of $I_\perp$ and $I_\parallel$ at a time.

Figure 8A:
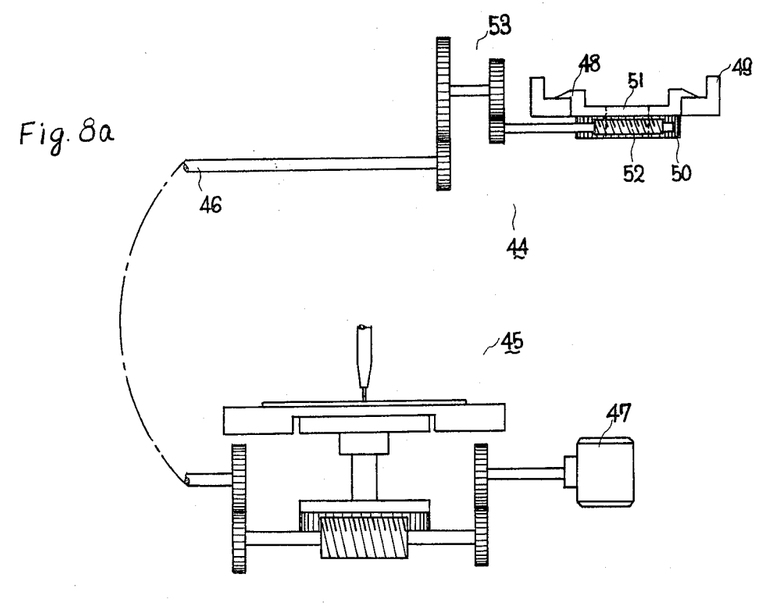
FIGS. 8(a), (b), (c) and (d) are the views showing a device to rotate and incline a sample holder in an instrument for the molecular orientation measurement according to this invention.

FIGS. 8(a), (b), (c) and (d) are the schematic representations of a device to rotate a sample two-dimensionally within the sample coordinate system, and, furthermore, to rotate the said sample coordinate system three-dimensionally within the measurement coordinate system.

In FIG. 8(a), 44 is a sample rotating device (hereinafter referred to as a goniometer), 45 a circular spectrum recorder, 46 a flexible shaft connecting the goniometer and the circular spectrum recorder, and 47 a synchronous motor rotating the goniometer and the circular spectrum recorder synchronously.

In the goniometer 44, 48 is a sample rotating table on which the sample holder and the sample are placed. The sample rotating table 48 is supported by a tilting table A 49 so as to be able to rotate freely on it, with a worm wheel 50 attached to its shaft. The center of the shaft 51 of the sample rotating table 48 is made hollow in order to let an exciting light in onto the sample from below also, thus enabling to carry out not only the reflection measurement but also the transmission measurement. A worm 52 engaged with the worm wheel 50 is connected with a group of gears 53 to transmit the rotation of the synchronous motor 47 to the sample rotating table 48 which is, thus, rotated within a plane of the tilting table A 49.

Figure 8B:
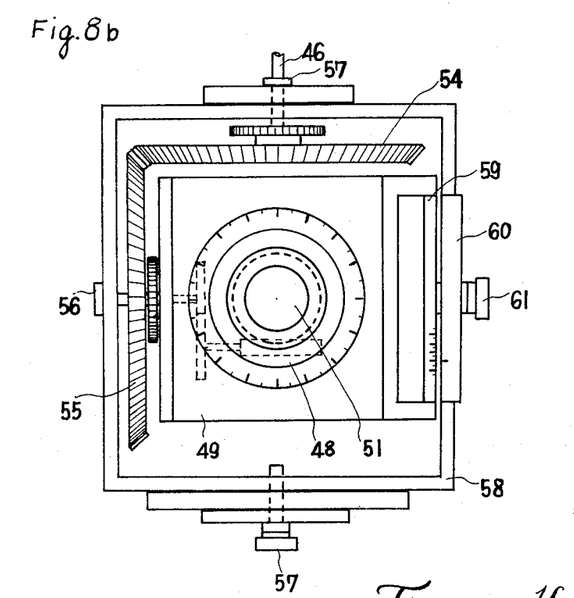
Figure 8C:
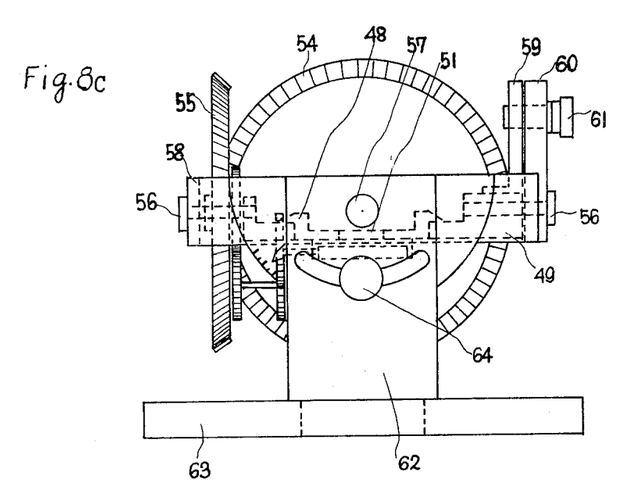

FIGS. 8(b), (c) and (d) show a more concrete construction of the goniometer. The rotation of the flexible shaft 46 is transmitted first to a bevel gear A 54, which is found in the group of gears 53 shown in FIG. (a). And the worm 52 is rotated through a bevel gear B 55 engaged with the bevel gear A 54, followed by the rotations of the worm wheel 50 and the sample rotating table 48. No other transmission gears than the bevel gears A 54 and B 55 are shown in the figures, since they are of well-known construction. The bevel gear A 54 is fitted to a sample tilting shaft B 57 that serves as a rotation shaft of the tilting table B 58, while the bevel gear B 55 is fitted to a sample tilting shaft A 56 that serves as a rotation shaft of the tilting table A 49.

The type of two-dimensional orientation of a sample can be measured by the above-mentioned rotation of the sample rotating table 48 on the tilting table A 49. For the purpose of measuring the type of three-dimensional orientation, however, a sample coordinate system must be capable of rotating with respect to a measurement coordinate system, which can be performed by the two-dimensional inclination of the sample rotating table 48.

Figure 8D:
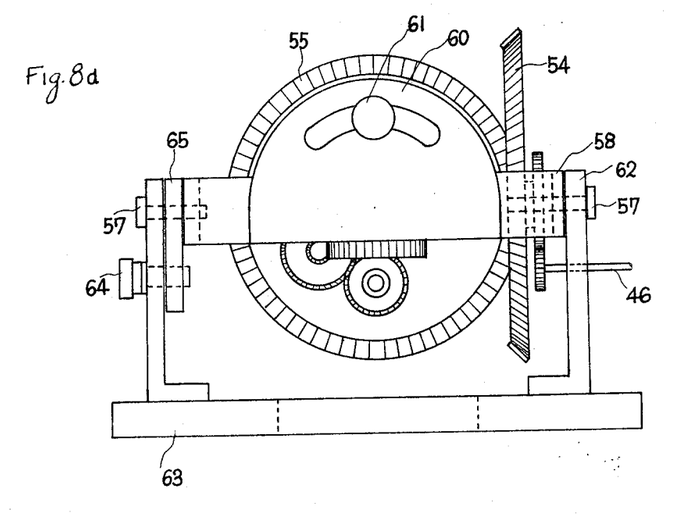

An inclination of the sample in one direction is carried out by inclining the table A 49 as follows. The tilting table A 49 containing the sample rotating table 48 is supported on the tilting table B 58 by means of the sample tilting shaft A 56. The rotation of the tilting table A 49 around the sample tilting shaft A 56 is carried out by a sample tilting knob A 61 that pierces an index ring 60 on the tilting table A fixed to the tilting table B 58, which ring being engaged, by means of the screw, with a scale ring 59 fixed to the tilting table A 49. As shown in FIG. (d), a part of the index ring 60 on the tilting table A is hollowed out in the shape of a circular arc. The tilting table A can be rotated if the sample tilting knob A 61 is loosened and moved along the circular-arc-shaped hollow. And it can be fixed at a certain angle of inclination by fastening the sample tilting knob 61. To learn the angle of inclination of the tilting table A 49, the index is arranged on the index ring 60 and the scale also is arranged on the scale ring 59, both being fitted on the tilting table A. At this rotation of the tilting table A 49, a group of gears, including a bevel gear B 55, attached to the tilting table A 49 and the sample tilting shaft 56 rotate together as one body. Therefore, the rotation of the sample rotating table 48 within the tilting table A 49 after the said rotation is carried out in the same way as before. Between the bevel gear B 55 and the sample tilting shaft 56 is a friction device, whereby the rotation of an input shaft rotates the bevel gear B 55 which, in turn, rotates the sample rotating table 48 two-dimensionally. But it can not rotate it three-dimensionally. In contrast with this, if the sample rotating table is rotated three-dimensionally, the bevel gear B 55 turns with it.

An inclination of the sample in the other direction is made by the inclination of the tilting table B 58. The tilting table B 58 containing the sample rotating table 48 and the tilting table A 49 is attached to a holder 62 by means of the sample tilting shaft B 57 and the holder 62 is fixed to a base plate 63. The tilting table B 58 can be inclined by a sample tilting knob B 64, like the case of inclining the tilting table A 49. The sample tilting knob B 64 is engaged, by means of the screw, with a scale ring 65 that is attached to the tilting table B 58 in such a manner as to be situated between the holder 62 and the tilting table B 58, and pierces the holder 62. As shown in FIG. (a), a part of the sample tilting knob B 64 pierced by the holder forms a circular-arc-shaped hollow. Therefore, if the knob is loosened to move about within the said circular-arc-shaped hollow, the tilting table B 58 can be inclined, while if it is fastened, the tilting table B 58 can be fixed at any optional angle. To learn the angle of inclination of the tilting table B 58, an index is arranged on the holder 62 and a scale also is arranged on the scale ring of the tilting table B. On this occasion, of course, the tilting table B 58 is rotated together with the tilting table A 49, the group of gears, etc. Therefore, a two-dimensional rotation of the sample rotating table 48 can be carried out in the same manner as before the three-dimensional rotation. In this figure, the circular-arc-shaped hollows made in the index ring 60 and the holder 62 of the tilting table A are symmetrical in shape, so that the sample tilting knobs A and B come to the central portion of the hollows when the sample rotating table is maintained horizontal. However, the shapes of the hollows are, of course, not limited to such symmetrical ones.

If the sample rotating table 48 of the goniometer 44 of the above-mentioned construction is rotated two-dimensionally, as shown in FIG. (a), and synchronously with the circular spectrum recorder 45 through the flexible shaft 46, the two- and three-dimensional angular distribution spectra can be obtained at will with respect to the intensity of the polarized components in the fluorescence emanated from the sample.

Figures 7, 9:
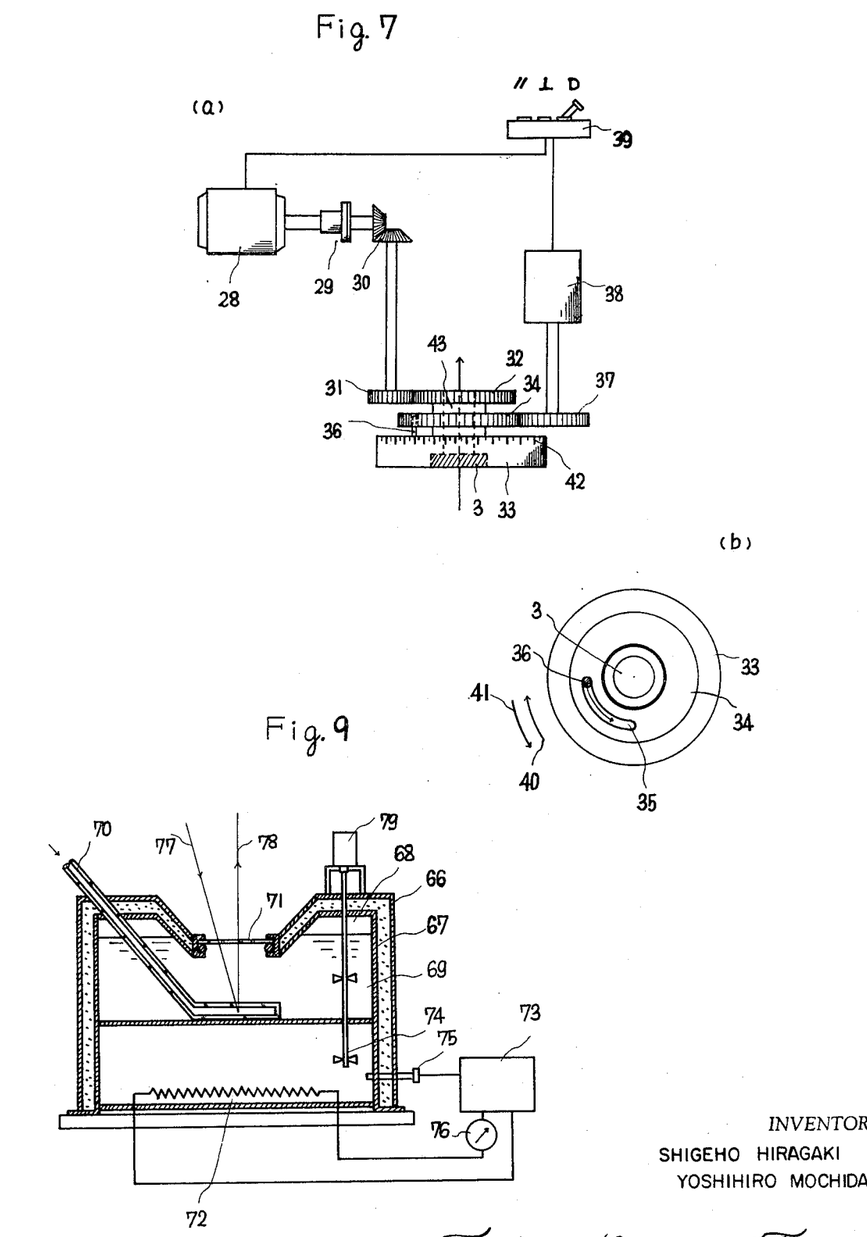
FIG. 9 is a view showing the construction of a sample temperature controller that controls the temperature of the samples in an instrument for the molecular orientation measurement according to this invention.

FIG. 9 is a schematic representation of the construction of a sample temperature controller used for controlling the temperature of a sample in an instrument for the molecular orientation measurement according to this invention, in which 66 is an outer frame of the temperature controller proper, 67 an inner frame of the same, 68 the inside of the same, 69 a temperature controlling liquid put into the inside of the temperature controller proper, 70 a sample container, 71 a window, 72 a heater, 73 a temperature regulator, and 74 a stirring fan. For the purpose of heat insulation and temperature maintenance; the temperature controller proper is double-walled by the outer and inner frames, and the space between them is packed with such an insulating material as asbestos to maintain the temperature of the inside. In the upper central part of the temperature controller proper is made a window 71, and a border between the former and the latter is sealed so as not to let the temperature controlling liquid leak out. The sample container 70 is placed below the window 71 within the temperature controller proper. This sample container may be either of a fixed type as illustrated or of a removable type capable of being set every time it is used. In the lower part of the temperature controller proper is installed the heater 72 to heat the temperature controlling liquid. The temperature of the said liquid is controlled by the temperature regulator 73 which maintains the temperature of the inside at a certain preset temperature by regulating the current flowing through the heater by means of the temperature of the liquid detected by a thermistor 75. And the temperature of the inside can be learned by reading on an ampere-meter 76 the current flowing through the heater 72. The stirring fan 74 designed to maintain the temperature of the inside uniform can be rotated at will by a motor 79. The temperature controlling liquid placed in the temperature controller proper has such properties that its refractive index remains constant irrespective of the temperature fluctuations, that it does not emanate fluorescence even at a high temperature, and that its refractive index again has a property almost equal to those of the materials used for the window and the sample container. And a sample to be measured is placed in the sample container 70, and then a polarized exciting light is introduced from above, through the window 71, onto the sample. The fluorescence 78 emitted by the sample is derived upward through the window 71, passed through an optical system comprising, for example, a cut filter, an analyzer, etc., and measured for its polarization characteristics. The turbulence in the electric vector direction of the polarized light is attributable to the difference of the refractive index between the temperature controlling liquid and the materials used for the window and the sample container. Therefore, the use of the temperature controlling liquid satisfying the above-mentioned conditions will minimize the turbulences in the electric vector direction of the polarized exciting light as well as in the polarization characteristics of the fluorescence.

Let's consider, for example, about the cases wherein measurement is carried out by making use of the lights in the ultraviolet visible and near infrared regions. For the measurement carried out in these regions, fused quartz is in common use as a transmission material. When this fused quartz having a refractive index ($n$) of 1.46 is used as the material for the window and the sample container, the conditions to be satisfied by the temperature controlling medium are that it has a refractive index that remains constant at approximately 1.46 irrespective of the temperature fluctuations and that it does not emit fluorescence at a high temperature. When various kinds of liquids falling within the range of the above-mentioned conditions were checked, glycerine was found to satisfy them best. Glycerine has refractive index ($n$) of 1.47 which does not change with the temperature as well as a boiling point of 290° C which makes itself capable of controlling the temperature up to 250° C, and does not emit fluorescence at a high temperature.

When the measurement is carried out with the above-mentioned temperature controller, while keeping the temperature of the sample constant, it is possible to obtain a spectrum of high reliability by minimizing the influence of the turbulence in the electric vector direction of the fluorescence.

What is claimed is:

1. An instrument for molecular orientation measurement comprising in combination; a light source, a lens system for converting the light from the light source into a parallel light flux, a monochromatic light filter for passing light from the lens system and for eliminating light out of the range of the wave length for excitation, a polarizer for receiving light from the monochromatic light filter and for obtaining a linearly polarized light, a sample holder for holding a sample to be illuminated by light from said polarizer, an analyzer for analyzing the polarized components of fluorescence emitted by the sample, a cut filter for cutting off light out of the range of the wave length of the fluorescence emanating from the analyzer, a detector, a lens system for condensing the light passed through the cut filter onto the detector, means in operative relationship for making electric vector directions of the linearly polarized lights incident upon the sample and the detector, respectively, parallel and perpendicular to each other, means in operative relationship for gradually and relatively changing the electric vector direction of the linearly polarized light incident upon the sample with respect to the orientation direction of the molecule system composing the sample, and means operatively located for measuring and indicating the intensity of the fluorescence incident upon the detector by treating the signals emitted from the detector through an electric system.

2. An instrument for molecular orientation measurement according to claim 1, further including an additional exciting optical system comprising a light source, a lens system for converting the light from the last-mentioned light source into a parallel light flux, a monochromatic light filter for passing light from the last-mentioned lens system and for eliminating light out of the range of the wave length for excitation, and a polarizer for receiving light from the last-mentioned monochromatic light filter and for obtaining a linearly polarized light, one of said exciting optical systems being designed as a reflection system and the other as a transmission system.

3. An instrument for molecular orientation measurement according to claim 1, wherein the light emitted from the light source is divided into two light fluxes, one being a sample exciting flux and the other being a reference or standard flux, a chopper for selectively interrupting the sample exciting flux and the reference flux, a light extinguisher for extinguishing the reference or standard flux, and wherein the fluorescence emitted by the sample upon the incidence of the exciting flux and the reference flux extinguished through the light extinguisher are alternately led into the detector for measurement and comparison.

4. An instrument for molecular orientation measurement according to claim 1, further including a condensing lens system installed between the polarizer and the sample holder for reducing the parallel light flux coming out of the polarizer, and an objective lens system located between the sample holder and the analyzer for enlarging a fluorescent image from the sample into a parallel light flux.

5. An instrument for molecular orientation measurement according to claim 1, including means for rotating the analyzer and the sample holder independently of the fixed polarizer to make the electric vector directions of the linearly polarized light incident upon the sample and the detector, respectively, parallel and perpendicular to each other and to gradually and relatively change the electric vector direction of the linearly polarized light incident upon the sample with respect to the orientation direction of the molecule system of the sample.

6. An instrument for molecular orientation measurement according to claim 1, including means for rotating the polarizer and the analyzer synchronously relative to the sample holder to make the electric vector directions of the linearly polarized light incident upon the sample and the detector, respectively, parallel and perpendicular to each other and to gradually and relatively change the electric vector direction of the linearly polarized light incident upon the sample with respect to the orientation direction of the molecule system of the sample.

7. An instrument for molecular orientation measurement according to claim 5, wherein said means for rotating the analyzer further includes a magnet brake, a brake gear fitted to said magnet brake, a first driving gear which has a circular-arc-shaped hollow in a section with a central angle of 90° a second driving gear, a shaft, a friction gear, a driving motor, a holder having a stopper affixed thereto, said holder attached to the shaft against which said first gear is allowed to rotate independently in order to transmit through said friction gear rotation of said driving motor to the second driving gear and the holder, while the first driving gear is engaged with said brake gear fitted to said magnet brake and said stopper fixed to the holder is positioned in the circular-arc-shaped hollow of the first driving gear.

8. An instrument for molecular orientation measurement as set forth in claim 5, wherein said means for rotating the sample holder includes a base plate; a holder fixed to said base plate and a first sample tilting shaft mounted on said holder, a first tilting table attached to said shaft and having a second sample tilting shaft positioned adjacent to said first table, a first bevel gear attached to said first shaft, a second tilting table having a sample rotating table which is rotated within a plane of the second tilting table by means of said first bevel gear attached to the sample tilting shaft, a second bevel gear engaged with the first bevel gear and fitted to the second sample tilting shaft, the inclination of the sample in one direction being carried out by the rotation of the second tilting table supported by the first tilting table and the inclination of the sample in the other direction being carried out by the rotation of the first tilting table supported by the holder.

9. A sample holder as set forth in claim 1, further including a temperature controller having a window therein, a sample container located within the temperature controller and adjacent said window, and a liquid having a substantially equal refractive index to those of the materials used for the window and the sample container located within the temperature controller, whereby the temperature of a sample is maintained by regulating the temperature of the liquid.

10. A sample holder as set forth in claim 9, wherein fused quartz is used as the material for the window and the sample container and wherein the liquid is glycerine.

11. An instrument for molecular orientation measurement according to claim 1, including means for rotating the polarizer and the sample holder independently of the fixed analyzer to make the electric vector directions of the linearly polarized light incident upon the sample and the detector, respectively, parallel and perpendicular to each other and to gradually and relatively change the electric vector direction of the linearly polarized light incident upon the sample with respect to the orientation direction of the molecule system of the sample.

12. An instrument for molecular orientation measurement according to claim 11, wherein said means for rotating the polarizer further includes a magnet brake, a brake gear fitted to said magnet brake, a first driving gear which has a circular-arc-shaped hollow in a section with a central angle of 90°, a second driving gear, a shaft, a friction gear, a driving motor, a holder having a stopper affixed thereto, said holder attached to the shaft against which said first gear is allowed to rotate independently in order to transmit through said friction gear rotation of said driving motor to the second driving gear and the holder, while the first driving gear is engaged with said brake gear fitted to said magnet brake and said stopper fixed to the holder is positioned in the circular-arc-shaped hollow of the first driving gear.

13. An instrument for molecular orientation measurement as set forth in claim 11, wherein said means for rotating the sample holder includes a base plate; a holder fixed to said base plate and a first sample tilting shaft mounted on said holder, a first tilting table attached to said shaft and having a second sample tilting shaft positioned adjacent to said first table, a first bevel gear attached to said first shaft, a second tilting table having a sample rotating table which is rotated within a plane of the second tilting table by means of said first bevel gear attached to the sample tilting shaft, a second bevel gear engaged with the first bevel gear and fitted to the second sample tilting shaft, the inclination of the sample in one direction being carried out by the rotation of the second tilting table supported by the first tilting table and the inclination of the sample in the other direction being carried out by the rotation of the first tilting table supported by the holder.

* * * * *